(12) United States Patent
Tseng et al.

(10) Patent No.: US 8,704,501 B2
(45) Date of Patent: Apr. 22, 2014

(54) DRIVER, CURRENT REGULATING CIRCUIT THEREOF, AND METHOD OF CURRENT REGULATION, WITH ALTERNATING VOLTAGES THEREIN

(75) Inventors: Kuan-Jen Tseng, Sinshih Township, Tainan County (TW); Ching-Wei Hsueh, Sinshih Township, Tainan County (TW)

(73) Assignee: Himax Analogic, Inc., Sinshih Township, Tainan County (TW)

( * ) Notice: Subject to any disclaimer, the term of this patent is extended or adjusted under 35 U.S.C. 154(b) by 548 days.

(21) Appl. No.: 12/509,572

(22) Filed: Jul. 27, 2009

(65) Prior Publication Data

US 2011/0018509 A1   Jan. 27, 2011

(51) Int. Cl.
*G05F 1/00* (2006.01)

(52) U.S. Cl.
USPC .......................................... 323/280; 323/281

(58) Field of Classification Search
USPC ......... 363/55, 56.01, 56.09, 56.11, 56.12, 20, 363/21.12, 131; 323/265, 268, 271–272, 323/280–281
See application file for complete search history.

(56) References Cited

U.S. PATENT DOCUMENTS

| | | | | |
|---|---|---|---|---|
| 4,238,813 A | * | 12/1980 | Carp et al. | 361/154 |
| 5,579,247 A | * | 11/1996 | Kerth et al. | 702/190 |
| 6,570,371 B1 | * | 5/2003 | Volk | 323/315 |
| 7,336,123 B2 | * | 2/2008 | Yoshida et al. | 330/9 |
| 7,919,936 B2 | * | 4/2011 | Liu et al. | 315/307 |
| 2005/0088207 A1 | * | 4/2005 | Rader et al. | 327/109 |
| 2006/0170401 A1 | * | 8/2006 | Chen et al. | 323/273 |
| 2009/0243571 A1 | * | 10/2009 | Cook et al. | 323/280 |

FOREIGN PATENT DOCUMENTS

JP        2010028445 A  *  2/2010

* cited by examiner

*Primary Examiner* — Jue Zhang
*Assistant Examiner* — Henry Lee, III
(74) *Attorney, Agent, or Firm* — McClure, Qualey & Rodack, LLP

(57) ABSTRACT

A current regulating circuit includes a transistor and an operational amplifier. The transistor receives a load current and generates a feedback voltage corresponding to the load current. The operational amplifier receives a reference voltage and the feedback voltage to control the transistor. The operational amplifier further includes an input stage and an output stage. The input stage includes amplifier inputs each for alternately receiving the reference voltage and the feedback voltage so that the input stage generates operating voltages corresponding to the reference voltage and the feedback voltage. The output stage receives the operating voltages alternately to control the transistor. A driver and a method of current regulation are also disclosed herein.

8 Claims, 3 Drawing Sheets

DRIVER, CURRENT REGULATING CIRCUIT THEREOF, AND METHOD OF CURRENT REGULATION, WITH ALTERNATING VOLTAGES THEREIN

BACKGROUND

1. Technical Field

The present disclosure relates to a current regulating circuit. More particularly, the present disclosure relates to a current regulating circuit in a load driver.

2. Description of Related Art

For a conventional driver for driving multiple channels of loads, e.g. LED, it may include a current regulator, for each channel, which regulates current delivery from the load and limits it to a constant value. For this type of current regulator, it may also include an operational amplifier cooperating with other elements to help limit the current delivery to a constant value.

However, since the operational amplifier often has a random offset in practice, the operational amplifiers for the channels may have offsets different from one another. As a result, a mismatch could thus occur between the currents regulated by the current regulators, causing the channels of LEDs to have various brightness.

SUMMARY

In accordance with one embodiment of the present invention, a current regulating circuit is provided. The current regulating circuit includes a transistor and an operational amplifier. The transistor is configured for receiving a load current and generating a feedback voltage corresponding to the load current. The operational amplifier is configured for receiving a reference voltage and the feedback voltage to control the transistor. The operational amplifier further includes an input stage and an output stage. The input stage includes amplifier inputs each for alternately receiving the reference voltage and the feedback voltage so that the input stage generates operating voltages corresponding to the reference voltage and the feedback voltage. The output stage is configured for receiving the operating voltages alternately to control the transistor.

In accordance with another embodiment of the present invention, a driver is provided. The driver includes current regulating circuits, each of which includes a transistor and an operational amplifier. The transistor includes a control terminal, a first terminal to receive a load current, and a second terminal having a feedback voltage in relation to the load current when the load current passes through the transistor. The operational amplifier includes a first amplifier input to be coupled to a reference voltage, a second amplifier input coupled to the second terminal of the transistor, and an amplifier output coupled to the control terminal of the transistor. The operational amplifier further includes an input stage and an output stage. The input stage includes a first input and a second input each alternately configured to be coupled to the reference voltage and the feedback voltage to correspondingly generate operating voltages. The output stage is alternately coupled to the operating voltages and coupled between the input stage and the amplifier output.

In accordance with yet another embodiment of the present invention, a method of current regulation is provided. The method includes the steps as follows: First, a feedback voltage corresponding to a load current is generated. Then, the feedback voltage and a reference voltage are alternately inputted into each of the inputs of an operational amplifier. After that, operating voltages corresponding to the reference voltage and the feedback voltage are generated in the operational amplifier. Afterwards, the operating voltages are alternately received to generate a control voltage from the operational amplifier according to the operating voltages. Then, the load current is regulated in accordance with the control voltage.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiments, with reference to the accompanying drawings as follows.

DESCRIPTION OF THE EMBODIMENTS

In the following detailed description, the embodiments of the present invention have been shown and described. As will be realized, the disclosure is capable of modification in various respects, all without departing from the disclosure. Accordingly, the drawings and description are to be regarded as illustrative in nature, and not restrictive.

Figure 1:
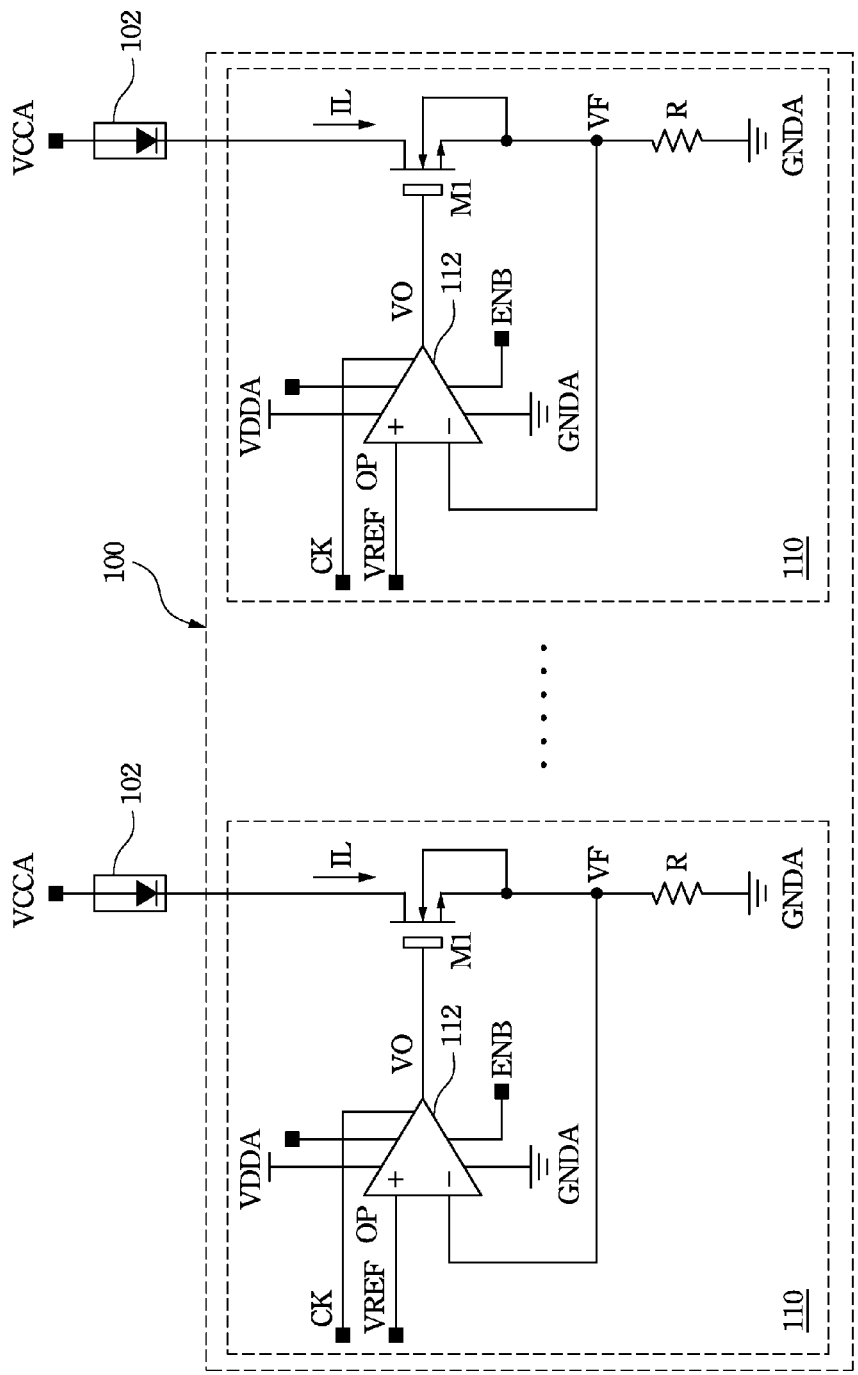
FIG. 1 illustrates a driver according to one embodiment of the present invention.

FIG. 1 illustrates a driver according to one embodiment of the present invention. The driver 100 is coupled to multiple channels of loads, e.g. light-emitting diodes (LEDs) 102, in which each of the channels can include several LEDs 102 connected in series. The driver 100 includes a plurality of current regulating circuits 110 which may be activated by a bias circuit (not shown). Each of the current regulating circuits 110 can be a current sink to receive and regulate the current from the respective channel of LEDs 102.

Each of the current regulating circuits 110 includes an operational amplifier 112 and a transistor M1, in which in present embodiment the transistor M1 is an NMOS transistor with its drain coupled to the LED 102 to receive a load current IL and its source coupled through a resistor R to a ground voltage GNDA. The operational amplifier 112 has an amplifier output VO and two amplifier inputs, e.g. positive input and negative input (referred to as VP and VN in FIG. 2), in which the positive input is configured to receive a reference voltage VREF, the negative input is coupled to the source of transistor M1, and the amplifier output is coupled to the gate of transistor M1 so as to control on-off state of transistor M1. When the operational amplifier 112 turns on the transistor M1 such that the load current IL passes through the transistor M1, the source of transistor M1 would have a feedback voltage VF in relation to the load current IL.

Figure 2:
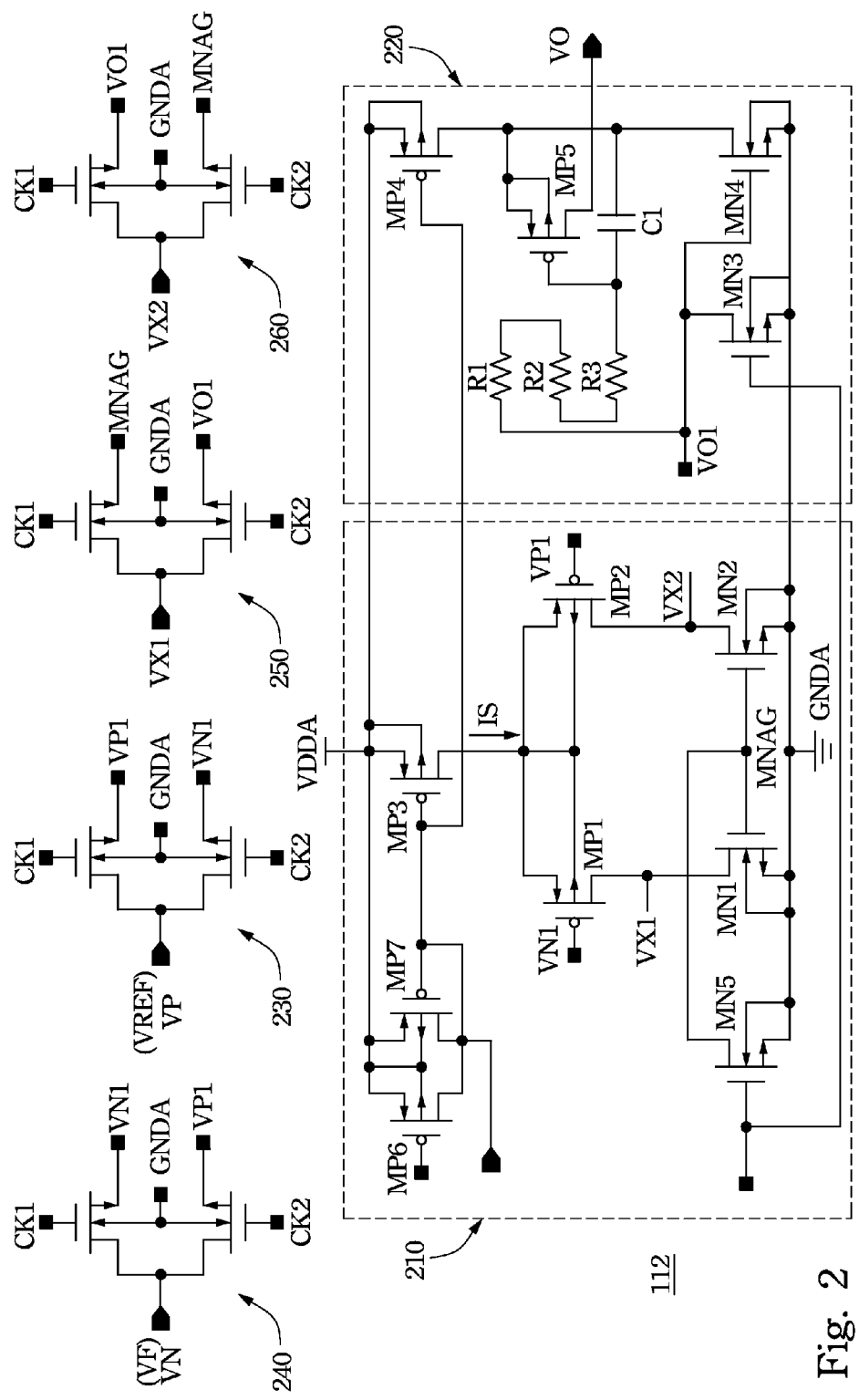
FIG. 2 illustrates the operational amplifier shown in FIG. 1 according to one embodiment of the present invention.

FIG. 2 illustrates the operational amplifier shown in FIG. 1 according to one embodiment of the present invention. The operational amplifier 112 includes an input stage 210 and an output stage 220. The input stage 210 includes two inputs VN1 and VP1, each of which is alternately configured to receive the reference voltage VREF from the positive input VP and the feedback voltage VF from the negative input VN of operational amplifier 112, thus generating operating voltages VX1 and VX2 corresponding to the reference voltage VREF and the feedback voltage VF. The output stage 220 is coupled between the input stage 210 and the amplifier output VO, and also includes an input VO1 for alternately receiving the operating voltages VX1 and VX2, thus generating a control voltage at the amplifier output VO to control the transistor M1 shown in FIG. 1.

The input stage 210 further includes a differential pair circuit consisting of PMOS transistors MP1 and MP2 and a current source implemented by a PMOS transistor MP3 for providing a current IS to the transistors MP1 and MP2. Gates of the transistors MP1 and MP2 are employed as the inputs VN1 and VP1 respectively, and drains of the transistors MP1 and MP2 are employed to generate the operating voltages VX1 and VX2. When the transistors MP1 and MP2 are separately and alternately controlled by the reference voltage VREF and the feedback voltage VF, the drains of the transistors MP1 and MP2 generate the operating voltages VX1 and VX2 corresponding to the current IS. In other words, total currents passing through the transistors MP1 and MP2 would be equal to the current IS, and the operating voltages VX1 and VX2 are thus complementary voltages.

The output stage 220 further includes a PMOS transistor MP5 and an NMOS transistor MN4, in which gates of the transistors MP5 and MN4 are coupled with each other and alternately receive the operating voltages VX1 and VX2, and drains of the transistors MP5 and MN4 are coupled to the amplifier output VO. When the operating voltages VX1 and VX2 are alternately inputted into the input VO1, the transistors MP5 and MN4 operate with the transition between the operating voltages VX1 and VX2, thus correspondingly generating the control voltage at the amplifier output VO.

The operational amplifier 112 can further include a first switch unit 230, a second switch unit 240, a third switch unit 250, and a fourth switch unit 260. These switch units are separately configured for alternating one signal to be transmitted to different nodes in accordance with clock signals CK1 and CK2 which have a phase difference therebetween of a half duty cycle, and each of the switch units includes two MOS transistors respectively controlled by the clock signals CK1 and CK2.

Specifically, the first switch unit 230 is coupled between the positive input VP of operational amplifier 112 and the input stage 210, so as to receive the reference voltage VREF at the positive input VP of operational amplifier 112 and to alternate the reference voltage VREF between the inputs VN1 and VP1 of the input stage 210, such that the reference voltage VREF can be transmitted from the positive input VP to the input VP1 according to the clock signal CK1 or transmitted from the positive input VP to the input VN1 according to the clock signal CK2.

Similarly, the second switch unit 240 is coupled between the negative input VN of operational amplifier 112 and the input stage 210, so as to receive the feedback voltage VF at the negative input VN of operational amplifier 112 and to alternate the feedback voltage VF between the inputs VN1 and VP1 of the input stage 210, such that the feedback voltage VF can be transmitted from the negative input VN to the input VN1 according to the clock signal CK1 or transmitted from the negative input VN to the input VP1 according to the clock signal CK2, which is in relation to the reference voltage VREF alternated between the inputs VN1 and VP1.

Moreover, the third switch unit 250 is coupled between the input stage 210 and the output stage 220, so as to receive and alternate the operating voltage VX1 between the node MNAG in the input stage 210 and the input VO1 of the output stage 220, such that the operating voltage VX1 can be coupled to the node MNAG according to the clock signal CK1 or coupled to the input VO1 according to the CK2.

Similarly, the fourth switch unit 260 is coupled between the input stage 210 and the output stage 220, so as to receive and alternate the operating voltage VX2 between the node MNAG in the input stage 210 and the input VO1 of the output stage 220, such that the operating voltage VX2 can be coupled to the input VO1 according to the clock signal CK1 or coupled to the node MNAG according to the CK2.

In operation, when the clock signal CK1 is asserted and the clock signal CK2 is de-asserted, the reference voltage VREF is conveyed through the first switch unit 230 from VP to VP1 and the feedback voltage VF is conveyed through the second switch unit 240 from VN to VN1, such that the transistors MP1 and MP2 are controlled by the feedback voltage VF and the reference voltage VREF respectively to generate the operating voltages VX1 and VX2. At this moment, the operating voltage VX1 corresponding to the feedback voltage VF is conveyed through the third switch unit 250 to the node MNAG, and the operating voltage VX2 corresponding to the reference voltage VREF is conveyed through the fourth switch unit 260 to the input VO1. If the operating voltage VX2 is at a relatively high level, the transistor MN4 turns on to pull down the output VO.

Referring to FIG. 1 and FIG. 2, if a conventional operational amplifier is employed in the regulating circuit 110, the current IL flowing into one regulating circuit 110 would be different from that flowing into another regulating circuit 110 because the operational amplifier usually has an offset causing a mismatch between the feedback voltage VF and the reference voltage VREF. Therefore, if the operational amplifier 112 shown in FIG. 2 is employed in the regulating circuit 110, the offset within the operational amplifier 112 could thus be corrected or decreased by the alternate of the reference voltage VREF and the feedback voltage VF and the alternate of the operating voltages VX1 and VX2. In other words, the averaged offset within the operational amplifier 112 could be minimized due to this type of alternate manner. As a result, the mismatch between the currents flowing into current regulating circuit 110 could be decreased.

Figure 3:
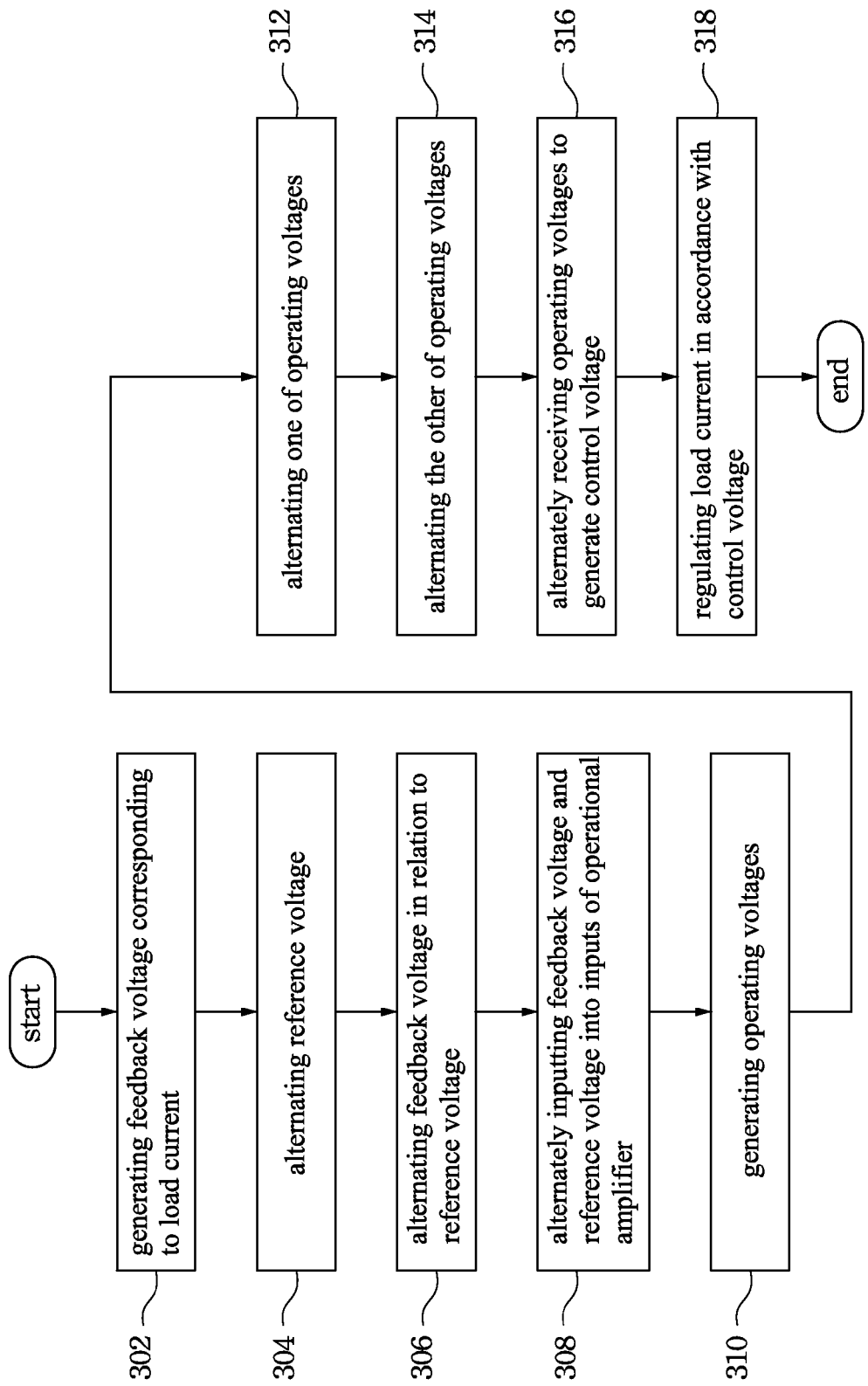
FIG. 3 illustrates a flow chart of a method of current regulation according to one embodiment of the present invention.

FIG. 3 illustrates a flow chart of a method of current regulation according to one embodiment of the present invention. Reference is now made to FIGS. 1, 2 and 3. First, the feedback voltage VF is generated corresponding to the load current IL (step 302). Then, the reference voltage VREF is alternated to be inputted between the inputs (e.g. VP1 and VN1) of the operational amplifier 112 (step 304), and the feedback voltage VF is alternated to be inputted between the inputs VP1 and VN1, in relation to the reference voltage VREF alternated between the inputs VP1 and VN1 (step 306). Notably, steps 304 and 306 can be performed inversely or concurrently. After that, the feedback voltage VF and the reference voltage VREF are alternately inputted into each of the inputs VP1 and VN1 (step 308). Afterwards, the operating voltages (e.g. VX1 and VX2) are generated corresponding to the reference voltage VREF and the feedback voltage VF, in the operational amplifier 112 (step 310).

After the operating voltages VX1 and VX2 are generated, one of the operating voltages VX1 and VX2 is alternated to be received (step 312), and the other of the operating voltages VX1 and VX2 is alternated to be received (step 314). Notably, steps 312 and 314 can be performed inversely or concurrently. Then, the operating voltages VX1 and VX2 are thus alternately received to generate a control voltage (e.g. VO) from the operational amplifier 112 according to the operating voltages VX1 and VX2 (step 316). Thereafter, the load current IL is regulated in accordance with the control voltage VO (step 318), and an offset within the operational amplifier 112 can be thus corrected by the alternate of the reference voltage VREF and the feedback voltage VF and the alternate of the operating voltages VX1 and VX2.

For the foregoing embodiments, the driver, the current regulating circuit thereof, and the method of current regulation can be employed to avoid the mismatch between the load currents which are sunk into the driver, such that multiple channels of loads can be driven by the driver with substantially the same amount of current.

As is understood by a person skilled in the art, the foregoing embodiments of the present invention are illustrative of the present invention rather than limiting of the present invention. It is intended to cover various modifications and similar arrangements included within the spirit and scope of the appended claims, the scope of which should be accorded with the broadest interpretation so as to encompass all such modifications and similar structures.

What is claimed is:

1. A current regulating circuit, comprising:
a transistor for receiving a load current and generating a feedback voltage corresponding to the load current; and
an operational amplifier comprising a first amplifier input for receiving a reference voltage, a second amplifier input for receiving the feedback voltage, and an amplifier output for controlling the transistor, the operational amplifier further comprising:
an input stage comprising a first input and a second input separately for alternating between receiving the reference voltage and the feedback voltage so that the input stage generates operating voltages corresponding to the reference voltage and the feedback voltage; and
an output stage for alternating between receiving the operating voltages to directly control the transistor;
a first switch unit for alternating one of the operating voltages to be inputted into the output stage;
a second switch unit for alternating the other of the operating voltages to be inputted into the output stage;
a third switch unit for alternating the reference voltage between the first input and the second input; and
a fourth switch unit coupled between the second amplifier input and the input stage for alternating the feedback voltage between the first input and the second input, in relation to the reference voltage alternated between the first input and the second input.

2. The current regulating circuit as claimed in claim 1, wherein an offset within the operational amplifier is corrected by the alternate of the reference voltage and the feedback voltage and the alternate of the operating voltages.

3. The current regulating circuit as claimed in claim 1, wherein the operating voltages generated by the input stage are complementary voltages.

4. A driver, comprising:
a plurality of current regulating circuits each comprising:
a transistor comprising a control terminal, a first terminal to receive a load current, and a second terminal having a feedback voltage in relation to the load current when the load current passes through the transistor; and
an operational amplifier comprising a first amplifier input to be coupled to a reference voltage, a second amplifier input coupled to the second terminal of the transistor, and an amplifier output directly coupled to the control terminal of the transistor, the operational amplifier further comprising:
an input stage comprising a first input and a second input separately for alternating between receiving the reference voltage and the feedback voltage to correspondingly generate operating voltages;
an output stage for alternating between receiving the operating voltages, the output stage coupled between the input stage and the amplifier output;
a first switch unit coupled between the input stage and the output stage to alternate one of the operating voltages to be coupled to the output stage;
a second switch unit coupled between the input stage and the output stage to alternate the other of the operating voltages to be coupled to the output stage;
a third switch unit coupled between the first amplifier input and the input stage for alternating the reference voltage between the first input and the second input; and
a fourth switch unit coupled between the second amplifier input and the input stage for alternating the feedback voltage between the first input and the second input, in relation to the reference voltage alternated between the first input and the second input.

5. The driver as claimed in claim 4, wherein an offset within the operational amplifier is decreased by the alternate of the reference voltage and the feedback voltage and the alternate of the operating voltages.

6. The driver as claimed in claim 4, wherein each of the current regulating circuits is a current sink.

7. A method of current regulation, comprising:
a transistor generating a feedback voltage corresponding to a load current;
inputs of an operational amplifier separately alternating between receiving the feedback voltage and a reference voltage;
an input stage generating operating voltages corresponding to the reference voltage and the feedback voltage, in the operational amplifier;
an output stage, in the operational amplifier, alternating between receiving the operating voltages to generate a control voltage to directly control the transistor;
regulating the load current by directly controlling the transistor in accordance with the control voltage;
a first switch unit alternating one of the operating voltages to be received;
a second switch unit alternating the other of the operating voltages to be received;
a third switch unit alternating the reference voltage to be inputted between the inputs; and
a fourth switch unit alternating the feedback voltage to be inputted between the inputs, in relation to the reference voltage alternated between the inputs, wherein the operational amplifier comprises the first switch unit, the second switch unit, the third switch unit and the fourth switch unit.

8. The method as claimed in claim 7, wherein an offset within the operational amplifier is corrected by the alternate of the reference voltage and the feedback voltage and the alternate of the operating voltages.

* * * * *